United States Patent
Vickers et al.

[11] Patent Number: 5,931,248
[45] Date of Patent: Aug. 3, 1999

[54] DURABLE ROLL-STABILIZING KEEL SYSTEM FOR HOVERCRAFT

[75] Inventors: David S. Vickers, Lynn Haven, Fla.; Ray W. Dyke, Orkney, United Kingdom

[73] Assignee: The United States of America as represented by the Secretary of the Navy, Washington, D.C.

[21] Appl. No.: 08/944,021

[22] Filed: Sep. 15, 1997

[51] Int. Cl.⁶ .................................................. B60V 1/16
[52] U.S. Cl. .......................... 180/116; 180/127; 180/128
[58] Field of Search .................................. 180/116, 124, 180/127, 128

[56] References Cited

U.S. PATENT DOCUMENTS

| | | | |
|---|---|---|---|
| 3,239,023 | 3/1966 | Jones | 180/128 |
| 3,306,388 | 2/1967 | Jones | 180/128 |
| 3,384,197 | 5/1968 | Bingham et al. | 180/128 |
| 3,756,343 | 9/1973 | Joyce | 180/124 |
| 4,176,729 | 12/1979 | Down | 180/127 |

*Primary Examiner*—Lanna Mai
*Assistant Examiner*—Michael Cuff
*Attorney, Agent, or Firm*—Harvey A. Gilbert; Donald G. Peck

[57] ABSTRACT

An inflated roll-stabilizing keel system has a first trough-shaped bladder and a second trough-shaped bladder attached to the underside of a forward portion of the first trough-shaped bladder. Holes pass through from the first trough-shaped bladder to the second trough-shaped bladder to allow inflation to flow therein. A plurality of shaped bladders are attached successively along and to the first trough-shaped bladder immediately aft of the second trough-shaped bladder. Each shaped bladder has a rectangular base portion attached to the underside of the first trough-shaped bladder. Each shaped bladder tapers downward from its base portion to an open apex. An inflation hole passes through from the first trough-shaped bladder to each of the shaped bladders to allow inflation air to flow therein. Once inflated, adjacent shaped bladders contact one another between the base portion and open apex in an area of contact. Each shaped bladder forms a substantially rectangular shape between its fore and aft areas of contact.

7 Claims, 2 Drawing Sheets

DURABLE ROLL-STABILIZING KEEL SYSTEM FOR HOVERCRAFT

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The invention relates generally to roll-stabilizers for hovercrafts, and more particularly to a durable roll-stabilizing longitudinal keel system for attachment to the underside of a hovercraft's hull.

BACKGROUND OF THE INVENTION

Hovercrafts are vehicles that travel across land or water just above a cushion of air. Generally, a skirt extends down from the periphery of the vehicle to the land or water in order to entrap the supporting cushion of air. Depending on the size of the vehicle and/or its intended application, it may be necessary to provide a stability system that reduces the effects of roll and pitch forces. For example, a longitudinally extending keel system can be attached to the underside of the vehicle hull along the vehicle's center line. Ideally, the keel stays in contact with the water's surface to prevent air on one side thereof from moving to the other side thereof. In this way, differential pressure cells are created to provide roll stability. Similarly, a laterally extending keel system can be used to provide pitch stability.

One such keel system is utilized by the U.S. Navy in its LCAC (landing craft, air cushion) vehicle. As shown in the plan view of FIG. 1, the LCAC has a segmented longitudinal keel system 20 and a segmented lateral keel system 50 contained within the periphery of a hovercraft's skirt (not shown). Longitudinal keel system 20 extends along the direction of craft motion which is indicated by arrow 100. Lateral keel system 50 is transverse to longitudinal keel system 20 and consists of a plurality of inflated cones 52.

One of cones 52 of lateral keel system 50 is shown in a side view in FIG. 2 which is a view taken along line 2—2 of FIG. 1. The side view in FIG. 2 depicts a triangle (of height h and base dimension b) that is essentially positioned parallel to craft motion 100. The portion of cone 52 parallel to the load forces determines the cone's ability to resist the buckling forces associated with craft motion 100. This is best understood by examining the relationship used to determine bending stress $\sigma_{bending}$, i.e., the force that causes buckling of a cone 52 subjected to craft motion 100. Bending stress $\sigma_{bending}$ can be defined mathematically as $$\sigma_{bending} = \frac{Mc}{I} \quad (1)$$

where M is the bending moment (i.e., the applied force at the cone's tip or apex times the height h of the cone), c is the distance from the outermost surface of a cone to its central axis (i.e., in this case, one half of the cone's width w as indicated in FIG. 1), and I is the moment of inertia. The moment of inertia I for a triangle is defined as $$I_{triangle} = \frac{bh^3}{36} \quad (2)$$

Since $\sigma_{bending}$ and I are inversely proportional, the b and h values of each cone 52 must be sufficient to keep $\sigma_{bending}$ from exceeding a threshold at which the (inflated) cone will buckle.

The existing longitudinal keel system is shown in greater detail in isolation in FIG. 3 and in cross-section in FIG. 4 which is taken along line 4—4 of FIG. 3. The longitudinal keel system is attached to the underside of the LCAC's hull which is shown in part and referenced by numeral 10. The longitudinal keel system consists of upper inflatable bladder sections 20A, 20B and 20C (extending fore to aft) attached to the underside of hull 10. Each upper inflatable bladder section 20A, 20B and 20C is trough-shaped and is inflated or pressurized by the craft's lift/fan system (not shown). Attached to each section 20A, 20B and 20C is a corresponding lower trough-shaped inflatable bladder section 22A, 22B and 22C. Inflation of sections 22A, 22B and 22C is accomplished by the provision of a plurality of inflation holes 24 (see FIG. 4) passing between the upper and lower inflatable lower bladder sections 20A and 22A. Thus, inflation of bladder sections 22A, 22B and 22C is accomplished when air passes through these holes. Port and starboard longitudinally extending blades 26 and 28 are attached to the lower portion of sections 22A, 22B and 22C. Blades 26 and 28 are flexible and oppose one another to define a channel therebetween. Holes 30 between blades 26 and 28 in the lower portion of lower inflatable bladder sections 22A, 22B and 22C provide an air exhaust and allow for the removal of water that might seep into the inflated sections while blades 26 and 28 cooperate to prevent water from entering holes 30.

Although accomplishing its intended function of roll stability, the longitudinal keel system shown and described above has been susceptible to environmental abrasion and impact damage that propagates forward and aft from the point of damage. Since the aft-most lower inflatable bladder section 22C is the section most likely to be damaged, such damage tends to propagate forward to section 22B. Damage greatly affects the craft's roll stability and is further costly to repair owing to the location of the keel system.

SUMMARY OF THE INVENTION

Accordingly, it is an object of the present invention to provide a roll stabilizer for a hovercraft.

Another object of the present invention is to provide a durable roll stabilizer for a hovercraft.

Still another object of the present invention is to provide a roll stabilizer for a hovercraft that can sustain some damage without substantially affecting the roll stability of the hovercraft.

Other objects and advantages of the present invention will become more obvious hereinafter in the specification and drawings.

In accordance with the present invention, an inflated roll-stabilizing keel system for a hovercraft is pressurized with a supply of pressurized air. A first trough-shaped bladder is disposed longitudinally along and attached to the underside of the hovercraft's hull and is coupled to the supply for inflation thereof. A second trough-shaped bladder is attached to the underside of a forward portion of the first trough-shaped bladder. Holes pass through from the first trough-shaped bladder to the second trough-shaped bladder to allow the pressurized air to flow therein for inflation thereof. A plurality of shaped bladders are attached successively along and to the first trough-shaped bladder immediately aft of the second trough-shaped bladder. Each shaped bladder has a base portion attached to the underside of the first trough-shaped bladder and tapers downward from the base portion to an open apex. An inflation hole passes through from the first trough-shaped bladder to each of the shaped bladders to allow the pressurized air to flow therein for inflation thereof. Once inflated, adjacent shaped bladders contact one another between the base portion and open apex in an area of contact. Each shaped bladder forms a substantially rectangular shape between its fore and aft areas of contact.

DETAILED DESCRIPTION OF THE INVENTION

Figure 3:
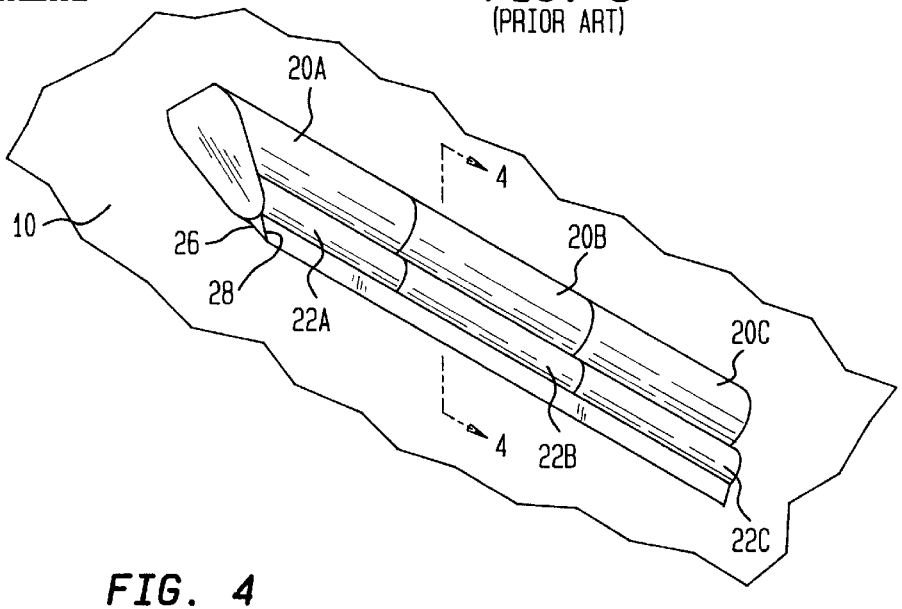
FIG. 3 is an isolated perspective view of the existing roll-stabilizing longitudinal keel system of the LCAC as it is attached to the underside of a hovercraft's hull.
Figure 4:
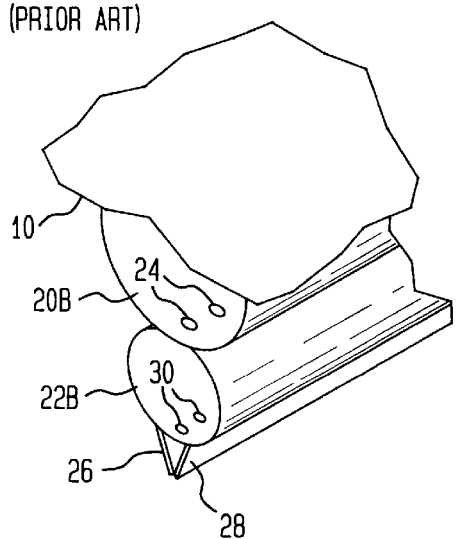
FIG. 4 is a perspective cross-sectional view of the existing longitudinal keel system of the LCAC taken along line 4—4 in FIG. 3.
Figure 5:
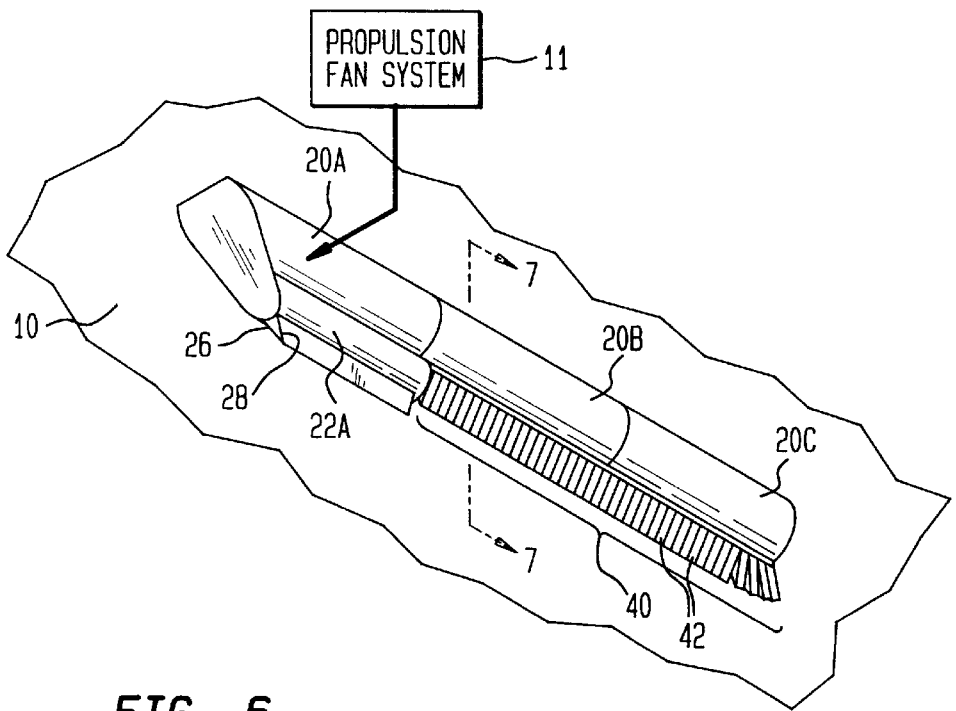
FIG. 5 is a perspective view of a roll-stabilizing longitudinal keel system according to the present invention.

Referring now to the drawings, and more particularly to FIG. 5, a roll-stabilizing keel system according to the present invention is shown attached to hull 10 of a hovercraft such as the Navy's LCAC. As with the existing roll-stabilizing keel system depicted in FIGS. 3 and 4, upper inflatable bladder sections 20A, 20B and 20C are attached to the bottom of hull 10 successively along the longitudinal center-line thereof. Sections 20A, 20B and 20C appear as they would when inflated by the hovercraft's propulsion fan system 11 which supplies pressurized air for inflation. Attached to the underside of section 20A is lower inflatable section 22A with blades 26 and 28 attached to the underside thereof. As with prior art keel systems, inflation of section 22A is made possible by a plurality of holes (e.g., similar to holes 24 in FIG. 4) passing between section 20A and 22A, and drainage of section 22A is made possible by the cooperation of holes (e.g., similar to holes 30 in FIG. 4) in the lower portion of section 22A between blades 26 and 28. However, it is here that the similarities end between the present invention and the existing longitudinal keel system.

Figure 6:
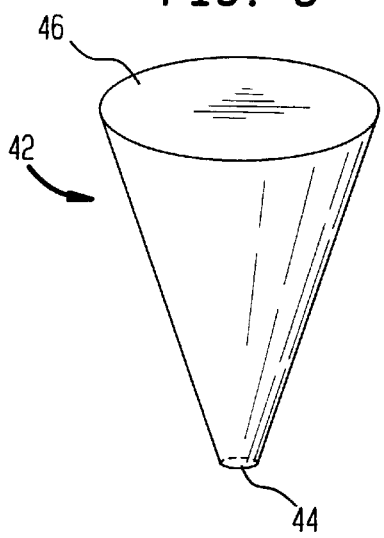
FIG. 6 is a perspective view of one cone section prior to its attachment to the longitudinal keel system of the present invention.

The longitudinal keel system of the present invention incorporates a series 40 of individually inflated bladder sections 42 in place of lower inflatable sections 22B and 22C. Since it is desired to make the construction of each section simple, each section 42 (prior to installation as a part of series 40) is a cone having a base 46 that is circular as shown in FIG. 6. Each cone section 42 is then individually attached at its base (i.e, base 46) to the underside of a respective one of upper sections 20B and 20C. As is visible in FIG. 7, each cone section 42 is inflated by the provision of one hole 25 passing between the respective one of upper sections 20B and 20C and the base of a cone section 42. Water drainage from each cone section 42 is made possible by providing a hole 44 at the apex thereof.

Figure 1:
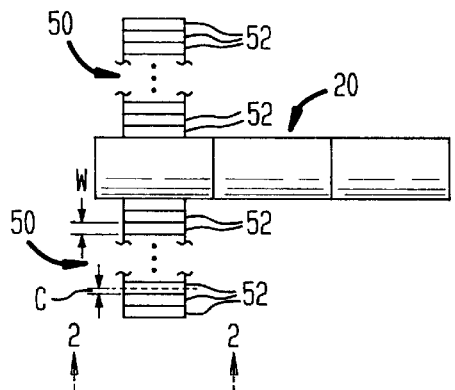
FIG. 1 is a schematic plan view of the existing longitudinal and lateral keel systems on the Navy's LCAC vehicle.
Figure 2:
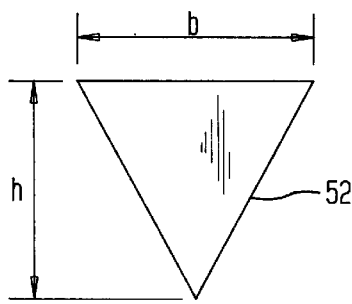
FIG. 2 is a side view of one of the lateral keel system's cones as taken along line 2—2 in FIG. 1.

In the present invention, it is also desirable to have both sides of series 40 appear as a relatively flat surface. In other words, series 40 ideally resembles a longitudinally-extending wedge (along the direction of craft motion 100) when cone sections 42 are inflated. Further, it is necessary for each cone section 42 to resist buckling and deflation when subjected to a load, i.e., the load generated from craft motion 100. Similar to the situation described above with respect to cones 52 of lateral keel system 50 (FIGS. 1 and 2), the portion of each cone section that is parallel to the load direction determines the cone section's ability to resist buckling. Thus, when inflated, the shape and dimensions of each cone section 42 should be such that the bending stress $\sigma_{bending}$ is kept from exceeding a threshold value at which the inflated cone section will buckle. To achieve the above goals for the longitudinal keel system, the base 46 of each cone section 42 (when installed as part of series 40) is square or rectangularly shaped as would be the case if each cone section were considered to be a piece of the overall wedge-shape of series 40. Thus, base 46 (which is circular prior to installation as shown in FIG. 6) must be formed into a rectangle (see FIG. 7) as it is being attached to one of sections 20B and 20C. Accordingly, the material used for each of cone sections 42 must be conformable or compliant while also being impervious to water. A suitable material meeting the criteria is a nylon weave fabric coated with rubber.

Figure 7:
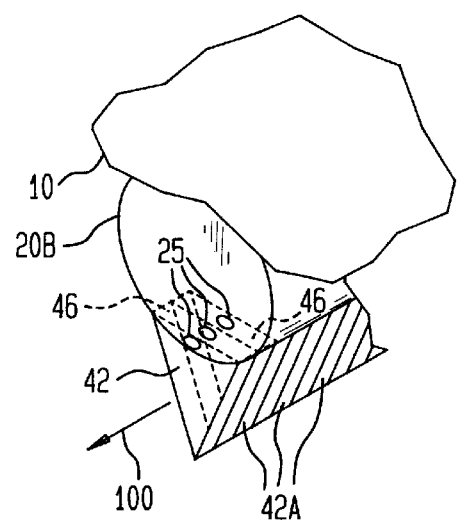
FIG. 7 is a perspective cross-sectional view of the present invention taken along line 7—7 of FIG. 5 showing how the cone sections are attached to the upper inflatable bladder section in the present invention.

Once inflated, adjacent cones are pressed into contact with one another with the portion of each cone section parallel to the direction of craft motion 100 being rectangular as indicated at 42A in FIG. 7. The rectangular shape 42A of each inflated cone section 42 offers good resistance to abrasion and impact forces due to craft motion 100 as evidenced by examining the moment of inertia relationship for a rectangle where $$I_{rectangle} = \frac{bh^3}{12} \qquad (3)$$

More specifically, for a given base b and height h, the rectangular shape provides a greater moment of inertia I (i.e., greater resistance to damage) than does the triangular shape of cones 52 in the lateral keel system.

In order to protect the aft portion of series 40 when hull 10 is pitched up, a number of cones 42B attached to the aft portion of section 20 can be progressively shortened in height as shown. As a result, the wedge-shaped assembly formed by series 40 is raked upward at a small angle θ with the horizontal where θ is on the order of 2°.

The advantages of the present invention are numerous. The cone sections are rectangularly shaped parallel to the direction of craft motion in order to resist buckling forces caused by craft motion. The use of individually inflated cone sections allows the lower portion of the roll-stabilizing keel to deflect when experiencing an environmental impact. Even if a severe impact is sustained and one or more of the cone sections are damaged, the damage remains localized to the section(s) near the impact location, i.e. damage does not propagate along the length of the keel. Thus, the longitudinal keel system can remain effective even when several sections thereof are damaged. Further, repair of individual cone sections is significantly less costly than repair of a much larger bladder section.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. An inflated roll-stabilizing keel system for a hovercraft, comprising:

a supply of pressurized air;

a first trough-shaped bladder disposed longitudinally along and attached to the underside of the hovercraft's hull, said first trough-shaped bladder coupled to said supply for inflation thereof via said pressurized air;

a second trough-shaped bladder attached to the underside of a forward portion of said first trough-shaped bladder, wherein a plurality of holes pass through from said first trough-shaped bladder to said second trough-shaped bladder to allow said pressurized air to flow therein for inflation thereof;

a plurality of shaped bladders attached successively along and to said first trough-shaped bladder immediately aft of said second trough-shaped bladder, each of said plurality of said shaped bladders having a base portion attached to the underside of said first trough-shaped bladder, each of said plurality of shaped bladders tapering downward from said base portion to an open apex, wherein an inflation hole passes through from said first trough-shaped bladder to each of said plurality of shaped bladders to allow said pressurized air to flow therein for inflation thereof so that adjacent ones of said plurality of shaped bladders contact one another between said base portion and said open apex in an area of contact, and wherein each of said plurality of shaped bladders forms a substantially rectangular shape between successive areas of contact; and an aft portion of said plurality of shaped bladders decreasing in height progressively from a forward-most bladder of said aft portion to an aftward-most bladder of said aft portion.

2. An inflated roll-stabilizing keel system as in claim 1 wherein each of said plurality of shaped bladders is made from a compliant material, each said base portion is substantially circular prior to attachment to the underside of said first trough-shaped bladder, and each said base portion is formed into a substantially rectangular shape when attached to the underside of said first trough-shaped bladder.

3. A roll-stabilizing keel system as in claim 2 wherein said compliant material is a nylon weave fabric coated with rubber.

4. An inflated roll-stabilizing keel system for a hovercraft, comprising:

a supply of pressurized air;

a first trough-shaped bladder disposed longitudinally along and attached to the underside of the hovercraft's hull, said first trough-shaped bladder coupled to said supply for inflation thereof via said pressurized air;

a second trough-shaped bladder attached to the underside of a forward portion of said first trough-shaped bladder, wherein a plurality of holes pass through from said first trough-shaped bladder to said second trough-shaped bladder to allow said pressurized air to flow therein for inflation thereof;

a wedge-shaped bladder assembly attached successively along and to said first trough-shaped bladder immediately aft of said second trough-shaped bladder, said bladder assembly having a base portion attached to the underside of said first trough-shaped bladder and tapering downward from said base portion to an apex having a plurality of openings distributed successively therealong, wherein a plurality of inflation holes pass through from said first trough-shaped bladder to said bladder assembly to allow said pressurized air to flow therein for inflation thereof; and wherein said bladder assembly comprises a plurality of shaped bladders, each of said plurality of shaped bladders having a rectangular base attached to the underside of said first trough-shaped bladder and tapered downward from said rectangular base to an open apex that defines one of said plurality of openings, wherein one of said plurality of inflation holes passes through from said first trough-shaped bladder to each of said plurality of shaped bladders to allow said pressurized air to flow therein for inflation thereof so that adjacent ones of said plurality of shaped bladders contact one another between said base portion and said open apex in an area of contact, and wherein each of said plurality of shaped bladders forms a rectangular shape between successive areas of contact, and wherein an aft portion of said bladder assembly is raked upward toward said first trough-shaped bladder.

5. An inflated roll-stabilizing keel system as in claim 4 wherein each of said plurality of shaped bladders is made from a compliant material, each said base portion is substantially circular prior to attachment to the underside of said first trough-shaped bladder, and each said base portion is formed into a substantially rectangular shape when attached to the underside of said first trough-shaped bladder.

6. A roll-stabilizing keel system as in claim 5 wherein said compliant material is a nylon weave fabric coated with rubber.

7. An inflated roll-stabilizing keel system as in claim 4 wherein said aft portion is raked upward at an angle of approximately 2°.

* * * * *